United States Patent
Ikeda

(10) Patent No.: US 7,373,106 B2
(45) Date of Patent: May 13, 2008

(54) MOBILE TERMINAL DEVICE AND METHOD OF UPDATING PROGRAM

(75) Inventor: Masahisa Ikeda, Saitama (JP)

(73) Assignee: NEC Corporation, Tokyo (JP)

( * ) Notice: Subject to any disclaimer, the term of this patent is extended or adjusted under 35 U.S.C. 154(b) by 522 days.

(21) Appl. No.: 09/986,412

(22) Filed: Nov. 8, 2001

(65) Prior Publication Data

US 2002/0055355 A1 May 9, 2002

(30) Foreign Application Priority Data

Nov. 8, 2000 (JP) ............................. 2000-340068

(51) Int. Cl.
*H04M 1/06* (2006.01)
(52) U.S. Cl. .................. 455/26.1; 455/412.1; 455/418; 455/422.1; 714/25; 714/26; 717/168; 717/169; 717/166
(58) Field of Classification Search .................. 455/41, 455/412.1, 418, 422.1, 26.1; 717/168, 170, 717/169; 714/25, 26
See application file for complete search history.

(56) References Cited

U.S. PATENT DOCUMENTS

| | | | | |
|---|---|---|---|---|
| 6,101,505 | A | 8/2000 | Sun | 707/203 |
| 6,275,694 | B1 * | 8/2001 | Yoshida et al. | 455/419 |
| 6,425,125 | B1 * | 7/2002 | Fries et al. | 717/168 |
| 6,658,247 | B1 * | 12/2003 | Saito | 340/7.2 |
| 6,687,901 | B1 * | 2/2004 | Imamatsu | 717/173 |

FOREIGN PATENT DOCUMENTS

| | | |
|---|---|---|
| EP | 0905991 | 3/1997 |
| EP | 0802694 | 10/1997 |
| EP | 000802694 A2 * | 10/1997 |
| EP | 1 049 346 A2 | 2/2000 |
| EP | 1 049 346 | 11/2000 |
| EP | 1 049 346 A | 11/2000 |
| JP | 9-81481 | 3/1997 |
| JP | 10094051 | 4/1997 |
| JP | 9-139727 | 5/1997 |
| JP | 3045118 | 9/1997 |
| JP | 9-331579 | 12/1997 |
| JP | 9331579 | 12/1997 |
| JP | 11039166 | 2/1999 |
| JP | 11065827 | 3/1999 |
| JP | 2938005 | 6/1999 |

(Continued)

OTHER PUBLICATIONS

Communication from European Patent Office in corresponding European case.

(Continued)

*Primary Examiner*—Joseph Feild
*Assistant Examiner*—Randy Peaches
(74) *Attorney, Agent, or Firm*—Whitham Curtis Christofferson & Cook, PC

(57) ABSTRACT

A method of updating a program in a terminal device is provided, wherein if a transmission of update data from a base station to a terminal device is interrupted due to any disconnection between them, then after it is verified that the terminal device becomes connected to the base station, the transmission process is re-started for remaining parts of the update data.

11 Claims, 5 Drawing Sheets

FOREIGN PATENT DOCUMENTS

| | | |
|---|---|---|
| JP | 11-239094 | 8/1999 |
| JP | 11-298959 | 10/1999 |
| JP | 11298404 | 10/1999 |
| JP | 2984649 | 11/1999 |
| JP | 2000-207681 | 7/2000 |
| JP | 2002-135350 | 5/2002 |
| WO | WO 98/38820 | 9/1998 |
| WO | WO00/30303 | 5/2000 |

OTHER PUBLICATIONS

Chinese Office Action dated Nov. 2, 2000 with Japanese translation, and English translation of Japanese translation.
Japanese Office Action dated Sep. 30, 2003 with English translation of pertinent portions.
Chinese office action dated Dec. 12, 2003.
English translation of the Chinese office action.
Japanese translation of the Chinese office action.
English translation of the Japanese translation of the Chinese office acion.
Japanese offoce action dated Mar. 16, 2004 with english translation of pertinent portions.
Communication from European Patent Office in corresponding European case dated Mar. 20, 2002.
English translation of the Chinese office action dated Dec. 12, 2003.
Japanese translation of the Chinese office action dated Dec. 12, 2003.
English translation of the Japanese translation of the Chinese office action dated Dec. 12, 2003.
European Office Action dated Jun. 16, 2005.

\* cited by examiner

MOBILE TERMINAL DEVICE AND METHOD OF UPDATING PROGRAM

BACKGROUND OF THE INVENTION

1. Field of the Invention

The present invention relates to a mobile terminal device and a method of updating a program stored therein.

2. Description of the Related Art

Update data are transmitted from a base station through a radio section to a mobile terminal for updating a program stored in the mobile terminal to obtain the new version of the program, wherein the program may, for example, be a system software for transmitting and receiving radio signals. Japanese lid-open patent publications Nos. 11-239094 and 11-298959 disclose the conventional methods of updating the program stored in the mobile terminal to obtain the new version of the program.

First one of the updating methods is that the entirety of the program is updated. Second one of the updating methods is that only a difference between the old version of the program stored in the mobile terminal and the new version of the program is selectively updated. In either of the methods, the updated data transmitted from the base station through the radio section are down-loaded into the mobile terminal for updating the program stored in the mobile terminal.

The conventional methods of updating the programs stored in the mobile terminal have the following disadvantages. A communication between the base station and the mobile terminal may be interrupted due to any defect of the electric field an the radio section or a voltage drop of a battery power of the mobile terminal. If a disconnection between the base station and the mobile terminal appears in the radio section during the transmission of the update data from the base station to the mobile terminal, then the transmission of the update data of the program stored in the mobile terminal is incomplete.

In accordance with the conventional updating methods, if the download of the update data into the mobile terminal is incomplete due to any interruption of the transmission, then the communication system do over the transmission of the update data again. This conventional method is the time-consuming method if the interruption of the transmission appears.

Even if the download of the update data into the mobile terminal is complete, and if the downloaded data include any defective data, then the updated program performs an abnormal function. The actual execution of the updated program makes it possible to verify whether the updated program is defective or non-defective. The conventional methods are enable to verify whether the updated program is defective or non-defective without actual execution of the updated program. If the defectiveness of the updated program could be verified after the actual execution of the updated program, then it is necessary to again download the updated program into the mobile terminal. This procedure is inconvenient for the user of the mobile terminal.

In the above circumstances, the development of a novel method of updating the program stored in the mobile terminal free from the above problems is desirable.

SUMMARY OF THE INVENTION

Accordingly, it is an object of the present invention to provide a novel method of updating the program stored in the mobile terminal free from the above problems.

It is a further object of the present invention to provide a novel method of updating the program stored in the mobile terminal, which may perfect the update process efficiently even if the connection in the radio section is interrupted.

It is a still further object of the present invention to provide a novel method of updating the program stored in the mobile terminal, which may perfect the update process efficiently even if the originally downloaded update-data include any defective data.

It is yet a further object of the present invention to provide a novel mobile terminal capable of updating the program stored in the mobile terminal free from the above problems.

It is yet a further object of the present invention to provide a novel mobile terminal capable of updating the program stored in the mobile terminal, which may perfect the update process efficiently even if the connection in the radio section is interrupted.

It is yet a further object of the present invention to provide a novel mobile terminal capable of updating the program stored in the mobile terminal, which may perfect the update process efficiently even if the originally downloaded update-data include any defective data.

The present invention provides a method of updating a program in a terminal device is provided, wherein if a transmission of update data from a base station to a terminal device is interrupted due to any disconnection between them, then after it is verified that the terminal device becomes connected to the base station, the transmission process is re-started for remaining parts of the update data.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A first aspect of the present invention is a method of updating a program in a terminal device, wherein if a transmission of update data from a base station to a terminal device is interrupted due to any disconnection between them, then after it is verified that the terminal device becomes connected to the base station, the transmission process is re-started for remaining parts of the update data.

It is preferable that the update data are divided into a plurality of data sets by the base station and the plural data sets are added with sequential pointers respectively.

It is preferable that after one with a next pointer for the remaining data set is confirmed, then the data set with the next pointer is first transmitted during the re-transmission processes.

It is preferable that after all of the update data are transmitted, then an operation test is automatically started.

It is preferable that if updated program includes any defectiveness, the updated program is re-written into the program existent in the mobile terminal.

A second aspect of the present invention is a terminal device including: a receiving unit for receiving update data transmitted; an updating unit for receiving the update data and updating an existent program with the update data; and a re-starting unit for re-starting transmission process of remaining non-transmitted parts of the update data, after it is verified that the terminal device becomes connected to the base station, if a transmission of update data from a base station to a terminal device is interrupted due to any disconnection between them.

It is preferable to further comprise: an additional unit for transmitting the remaining data sets with reference to pointers added to the data sets.

It is preferable that after all of the update data are transmitted, then an operation test is automatically started.

It is preferable to further include a re-writing unit for re-writing the updated program into the program existent in the mobile terminal.

This second aspect of the present invention has the same characteristics described above in connection with the first aspect of the present invention.

FIRST EMBODIMENT

Figure 1:
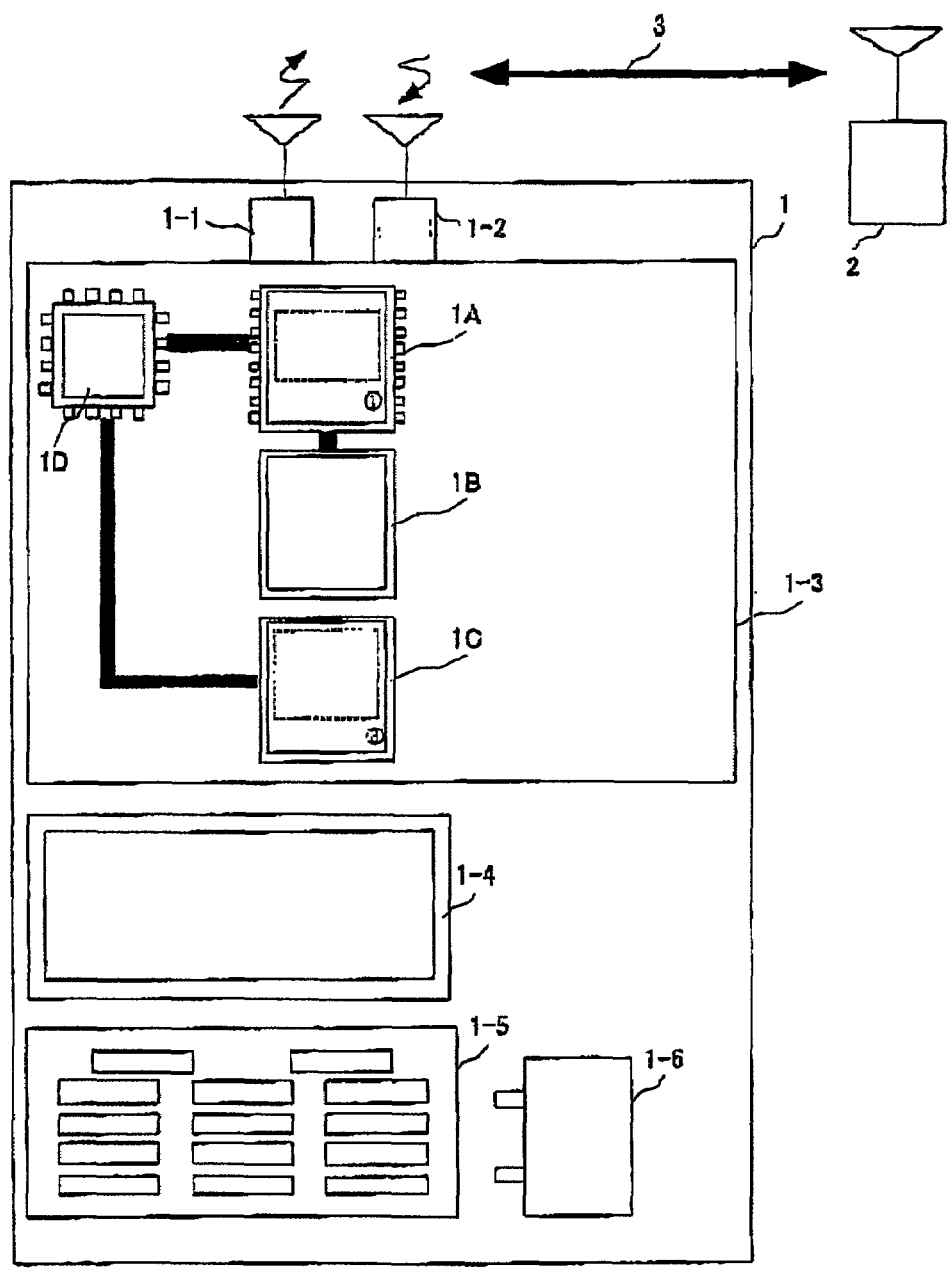
FIG. 1 is a schematic view illustrative of a radio communication system including a base station and a mobile terminal for performing a program-updating operation in a first embodiment in accordance with the present invention.

A first embodiment according to the present invention will be described in detail with reference to the drawings. FIG. 1 is a schematic view illustrative of a radio communication system including a base station and a mobile terminal for performing a program-updating operation in a first embodiment in accordance with the present invention.

The radio communication system may include a mobile terminal 1, a base station 2 and a radio section 3 between the mobile terminal 1 and the base station 2. The mobile terminal 1 may include a transmitter unit 1-1, a receiver unit 1-2, a processor unit 1-3, a display unit 1-4, an operational unit 1-5, and a battery 1-6. The processor unit 1-3 may further include a first storage area 1A for storing a system software for the normal operation, a second storage area 1B for providing a save area to the system software, a third storage area 1C for storing a version-up process software, and an arithmetic unit 1D. The second storage area 1B is electrically coupled to the first storage area 1A. The arithmetic unit 1D is electrically coupled to the first storage area 1A and to the third storage area 1C.

Figure 2:
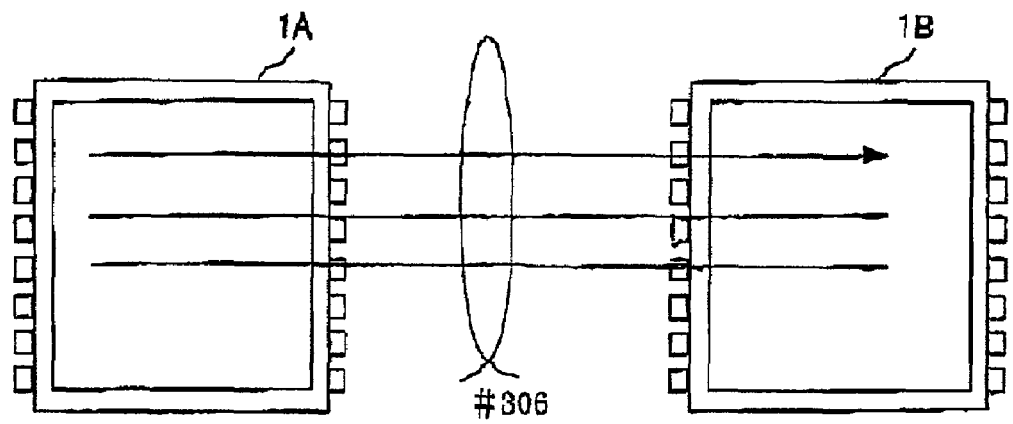
FIG. 2 is a schematic view illustrative of a part of the sequential process in FIG. 3.
Figure 2:
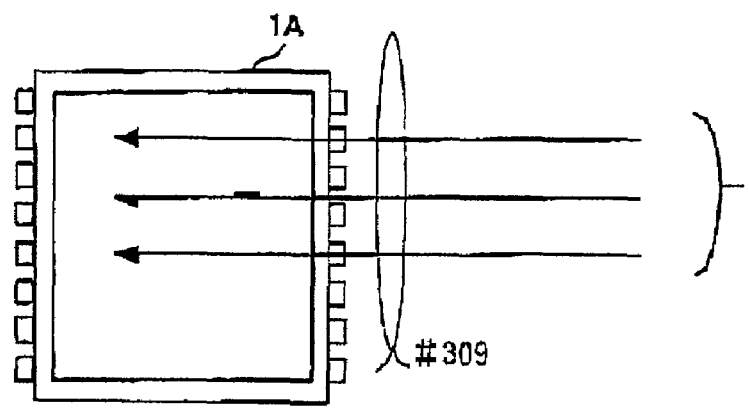
Figure 3:
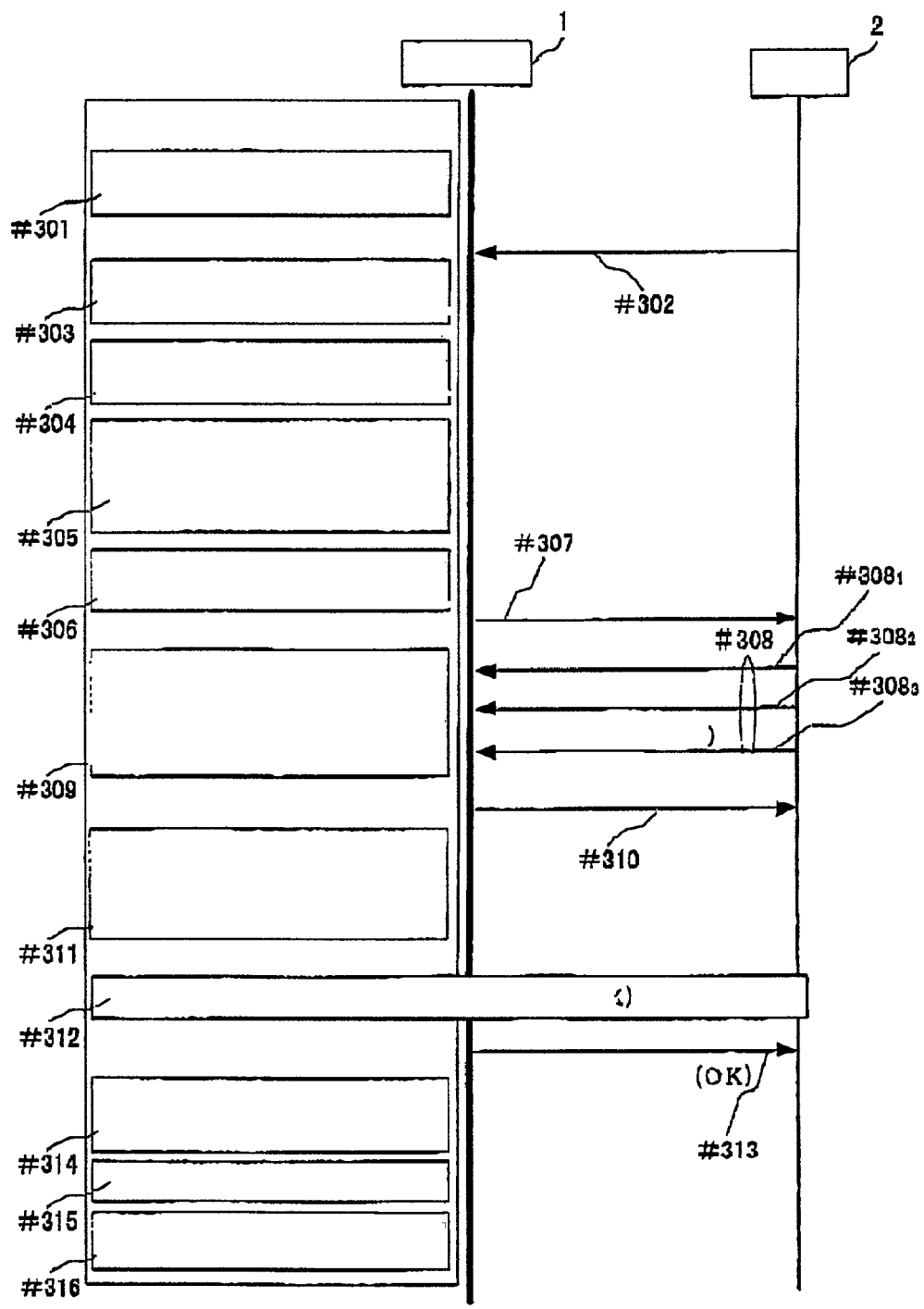
FIG. 3 is a flow chart showing sequential operations of the above communication system if the updating process is successful.

In accordance with the radio communication system, the normal operation system software may be updated into a new version as follows. FIG. 3 is a flow chart showing sequential operations of the above communication system if the updating process is successful. FIG. 2 is a schematic view illustrative of a part of the sequential process in FIG. 3.

The arithmetic unit 1D is operable deepening on the normal operation system software stored in the first storage area 1A (#301).

In this state, the update request is sent from the base station 2 sends through the radio section 3 to the mobile terminal 1 (#302)

The arithmetic unit 1D instructs the display unit 1-4 to display where it is now updating the system software (#303).

The arithmetic unit 1D further inhibits any inputs from the operation unit 1-5 (#304).

The arithmetic unit 1D switches the normal operation system software into the updating operation system software (#305) and restarting, where the normal operation system software is stored in the first storage area 1A, whilst the updating operation system software is stored in the third storage area 1C. The normal operation system software is the system software to be implemented only in the normal operation. The updating operation system software is the system software to be implemented only in the normal operation.

After restart, the arithmetic unit 1D copies the normal operation system software from the first storage area 1A to the second storage area 1B (#306), whereby the normal operation system software is once moved to the second storage area 1B.

The arithmetic unit 1D sends an updating data send request from the transmitter unit 1-1 through the radio section 3 to the base station 2 (#307). The base station 2 receives the updating data send request. After the preparation of the download of the new version normal operation system software is verified by the base station 2, the base station 2 sends updating data for the new version normal operation system software to the mobile terminal 1 (#308).

In this embodiment, the base station 2 divides the new version normal operation system software into first, second and third updating data sets (1), (2) and (3). The first, second and third updating data sets (1), (2) and (3) are respectively added with pointers which indicate sequences (#308-1), (#308-2) and (#308-3).

The mobile terminal 1 receives the first, second and third updating data sets (1), (2) and (3) from the base station 2 sequentially. The first storage area 1A stores the first, second and third updating data sets (1), (2) and (3) into the first storage area 1A, whereby the old version normal operation system software is rewritten into the new version normal operation system software.

After the new version normal operation system software has been stored into the first storage area 1A, the arithmetic unit 1D sends the base station 2 a notice that the update data completely received (#310), whereby the process for receiving the update data receiving process is completed. The base station 2 is notified from the mobile terminal by another notice that the new version normal operation system software has completely been downloaded.

After the notice of the receipt of the update data to the base station 2, the arithmetic unit 1D switches in use from the update operation system software stored in the third storage area 1C into the downloaded new version system software stored in the first storage area 1A (#311) and re-start. After the re-start, the arithmetic unit 1D conducts the basic operation test in cooperation with the base station 2 such as the basic operations, for examples, transmission and receiving-operations for confirmation of the operation based on the updated system software(#312).

If the operation test verifies that the operation is completely correct (OK), then the arithmetic unit 1D sends the base station 2 a notice that the software was completely updated (#313).

The arithmetic unit 1D deletes the display of the updating operation on the display unit 1-4 (#314).

The arithmetic unit 1D releases the operation unit 1-5 from the input-inhibition state (#315).

The updated normal operation system software is used (#316).

If the connection between the mobile terminal 1 and the base station 2 is disconnected in the radio section 3 due to any reason such as the field defect or the power voltage drop of the mobile terminal 1, then the mobile terminal 1 operates as follows.

Figure 4:
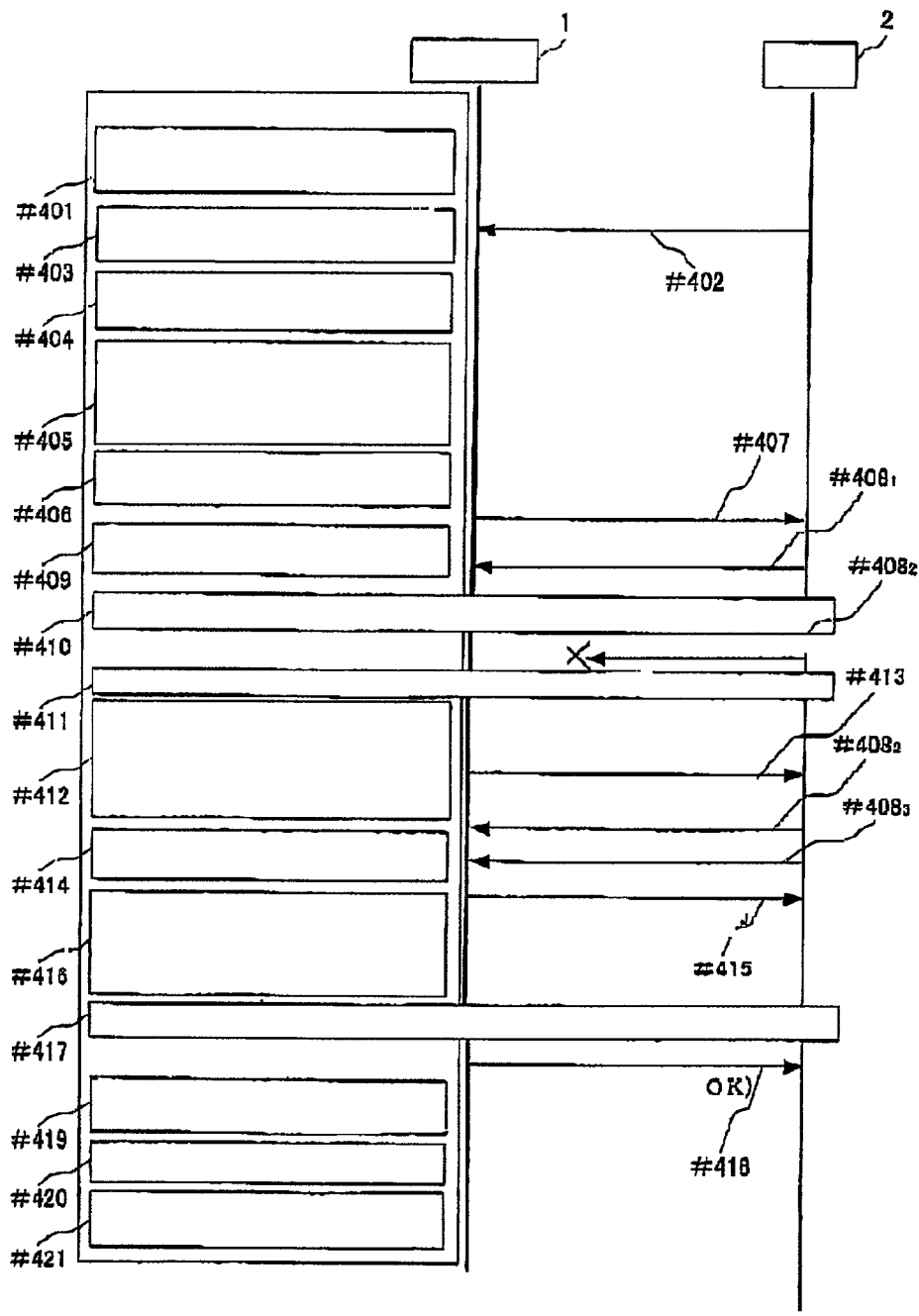
FIG. 4 is a flow chart showing sequential operations of the above communication system if the updating process is completed in case of the disconnection during the update data transmission.

FIG. 4 is a flow chart showing sequential operations of the above communication system if the updating process is completed in case of the disconnection during the update data transmission.

The arithmetic unit 1D is operable deepening on the normal operation system software stored in the first storage area 1A (#401).

In this state, the update request is sent from the base station 2 sends through the radio section 3 to the mobile terminal 1 (#402).

The arithmetic unit 1D instructs the display unit 1-4 to display where it is now updating the system software (#403).

The arithmetic unit 1D further inhibits any inputs from the operation unit 1-5 (#404).

The arithmetic unit 1D switches the normal operation system software into the updating operation system software (#405) and restarting, where the normal operation system software is stored in the first storage area 1A, whilst the updating operation system software is stored in the third storage area 1C. The normal operation system software is the system software to be implemented only in the normal operation. The updating operation system software is the system software to be implemented only in the animal operation.

After restart, the arithmetic unit 1D copies the normal operation system software from the first storage area 1A to the second storage area 1B (#406), whereby the normal operation system software is once moved to the second storage area 1B.

The arithmetic unit 1D sends an updating data send request from the transmitter unit 1-1 through the radio section 3 to the base station 2 (#407). The base station 2 receives the updating data send request. After the preparation of the download of the new version normal operation system software is verified by the base station 2, the base station 2 sends updating data for the new version normal operation system software to the mobile terminal 1 (#408).

In this embodiment, the base station 2 divides the new version normal operation system software into first, second and third updating data sets (1), (2) and (3). The first, second and third updating data sets (1), (2) and (3) are respectively added with pointers which indicate sequences (#408-1), (#408-2) and (#408-3).

The mobile terminal 1 receives only the first updating data set (1) from the base station 2. The first storage area 1A stores the first updating data set (1) into the first storage area 1A (#409). The disconnection between the mobile terminal 1 and the base station 2 appears in the radio section 3, whereby the receiving process by the mobile terminal 1 is interrupted (#410)

The mobile terminal 1 does not receive the second and third updating data sets (2) and (3).

When the radio section becomes connectable state or the battery becomes power up (#411), the arithmetic unit 1D verifies the pointer of the completely received final update data set and decides the next pointer in connection with the next data set which should be received next.

This next pointer of the second update data set (2) is set in the updating data transmission request (#412) and sends the request to the base station 2 (#413).

The base station 2 receives the request with the next pointer from the mobile terminal 1. The data transmission is re-started from the second update data set (2) with the next pointer (#408-2').

The mobile terminal 1 receives the second and third update data sets (2) and (3) (#408-2', #408-3'), and then stores the second and third update data sets (2) and (3) in the first storage area 1A (#414).

The first, second and third storage areas (1), (2) and (3) are completely stored in the first storage area 1A (#414). The old version system software is re-written into the new version system software.

After the new version normal operation system software has been stored into the first storage area 1A, the arithmetic unit 1D sends the base station 2 a notice that the update data completely received (#415), whereby the process for receiving the update data receiving process is completed. The base station 2 is notified from the mobile terminal by another notice that the new version normal operation system software has completely been downloaded.

After the notice of the receipt of the update data to the base station 2, the arithmetic unit 1D switches in use from the update operation system software stored in the third storage area 1C into the downloaded new version system software stored in the first storage area 1A (#416) and re-start. After the re-start, the arithmetic unit 1D conducts the basic operation test in cooperation with the base station 2 such as the basic operations, for examples, transmission and receiving-operations for confirmation of the operation based on the updated system software(#417).

If the operation test verifies that the operation is completely correct (OK), then the arithmetic unit 1D sends the base station 2 a notice that the software was completely updated (#418).

The arithmetic unit 1D deletes the display of the updating operation on the display unit 1-4 (#419).

The arithmetic unit 1D releases the operation unit 1-5 from the input-inhibition state (#420).

The updated normal operation system software is used (#421).

If the update data includes any defective data, then the mobile terminal 1 operates as follows.

Figure 5:
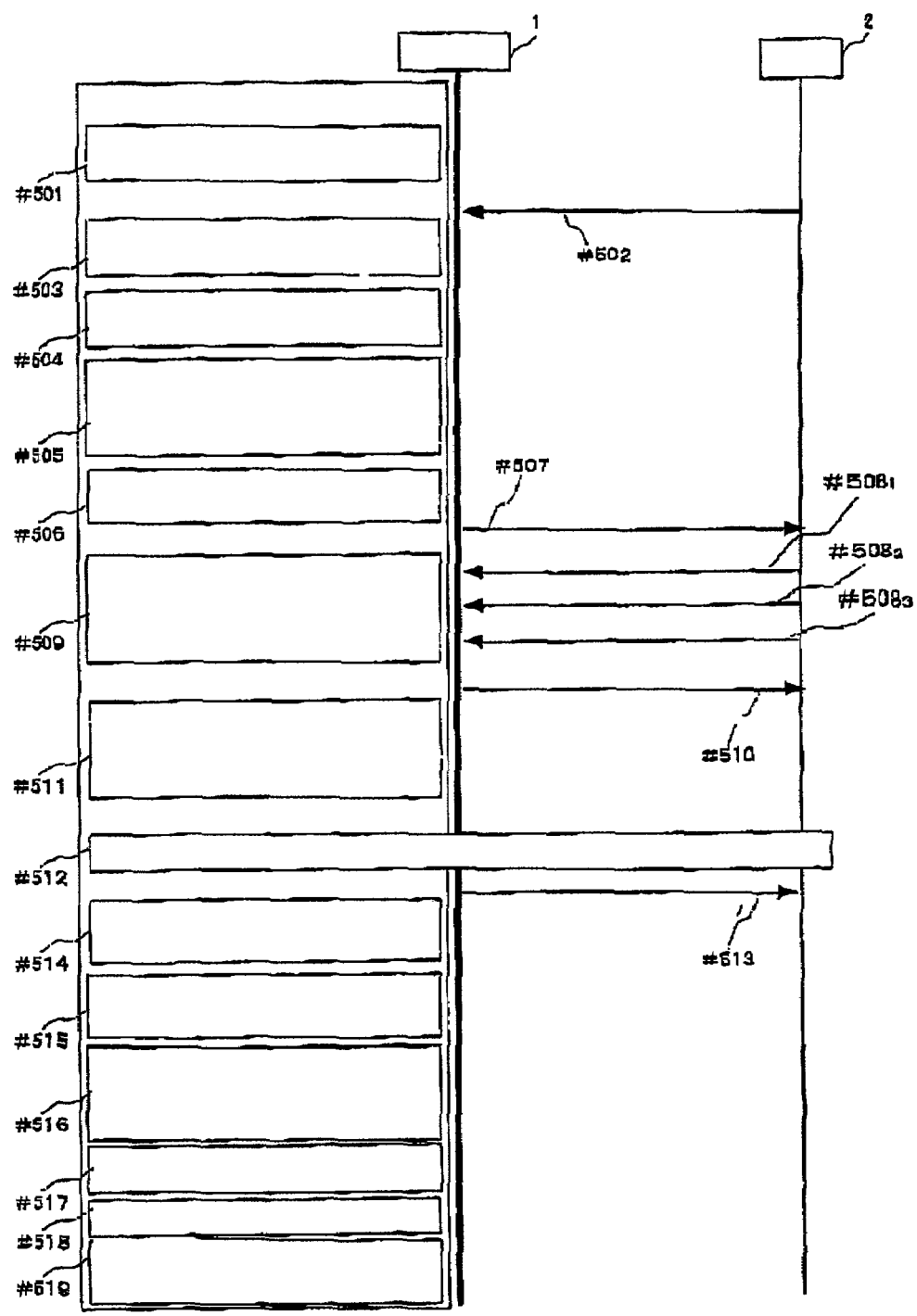
FIG. 5 is a flow chart showing sequential operations of the above communication system if the updating process is completed in case that the update data includes any defective data.

FIG. 5 is a flow chart showing sequential operations of the above communication system if the updating process is completed in case that the update data includes any defective data.

The arithmetic unit 1D is operable deepening on the normal operation system software stored in the first storage area 1A (#501).

In this state, the update request is sent from the base station 2 sends through the radio section 3 to the mobile terminal 1 (#502).

The arithmetic unit 1D instructs the display unit 1-4 to display where it is now updating the system software (#503).

The arithmetic unit 1D further inhibits any inputs from the operation unit 1-5 (#504).

The arithmetic unit 1D switches the normal operation system software into the updating operation system software (#505) and restarting, where the normal operation system software is stored in the first storage area 1A, whilst the updating operation system software is stored in the second storage area 1B. The normal operation system software is the system software to be implemented only in the normal operation. The updating operation system software is the system software to be implemented only in the normal operation.

After restart, the arithmetic unit 1D copies the normal operation system software from the first storage area 1A to the second storage area 1B (#506), whereby the normal operation system software is once moved to the second storage area 1B.

The arithmetic unit 1D sends an updating data send request from the transmitter unit 1-1 through the radio section 3 to the base station 2 (#507). The base station 2 receives the updating data send request. After the preparation of the download of the new version normal operation system software is verified by the base station 2, the base station 2 sends updating data for the new version normal operation system software to the mobile terminal 1 (#508).

In this embodiment, the base station 2 divides the new version normal operation system software into first, second and third updating data sets (1), (2) and (3). The first, second and third updating data sets (1), (2) and (3) are respectively added with pointers which indicate sequences (#508-1), (#508-2) and (#508-3).

The mobile terminal 1 receives the first updating data set (1) from the base station 2. The first storage area 1A stores the first updating data set (1) into the first storage area 1A (#509). Subsequently, the mobile terminal 1 receives the second updating data set (2) including defective data from the base station 2. Further, the mobile terminal 1 receives the third updating data set (3) including defective data from the base station 2, and then stores the second and third update data sets (2) and (3) in the first storage area 1A. The first, second and third storage areas (1), (2) and (3) are completely stored in the first storage area 1A. The old version system software is re-written into the new version system software.

After the new version normal operation system software has been stored into the first storage area 1A, the arithmetic unit 1D sends the base station 2 a notice that the update data completely received (#510), whereby the process for receiving the update data receiving process is completed. The base station 2 is notified from the mobile terminal by another notice that the now version normal operation system software has completely been downloaded.

After the notice of the receipt of the update data to the base station 2, the arithmetic unit 1D switches in use from the update operation system software stored in the third storage area 1C into the downloaded new version system software stored in the first storage area 1A (#511) and re-start. After the re-start, the arithmetic unit 1D conducts the basic operation test in cooperation with the base station 2 such as the basic operations, for examples, transmission and receiving-operations for confirmation of the operation based on the updated system software(#512).

If the operation test verifies that the operation is completely correct (OK), then the arithmetic unit 1D sends the base station 2 a notice that the result of the test is NG (#513).

The arithmetic unit 1D switches the normal operation system software into the updating operation system software (#514) and restarting, where the normal operation system software is stored in the first storage area 1A, whilst the updating operation system software is stored in the second storage area 1B. The normal operation system software is the system software to be implemented only in the normal operation. The updating operation system software is the system software to be implemented only in the normal operation.

After restart, the arithmetic unit 1D copies the normal operation system software from the second storage area 1B to the first storage area 1A (#516), whereby the normal operation system software is the old-version software.

The arithmetic unit 1D deletes the display of the updating operation on the display unit 1-4 (#517).

The arithmetic unit 1D releases the operation unit 1-5 from the input-inhibition state (#518).

The non-updated normal operation system software is used (#519).

If the mobile terminal 1 becomes defective, it becomes necessary to solve the defective by improvement by the software in the mobile terminal 1. For avoiding the miss-matching with the non-use state of the mobile terminal, the base station retrieves the mobile terminal which have been in the non-use state for a predetermined time period or longer.

The base station 2 downloads the update data to the retrieved mobile terminal in accordance with the above-described sequential processes shown in FIG. 3. The base station 2 receives the notice of the completion of the processes from the mobile terminal. The base station 2 retrieves another mobile terminal which has been in the non-use state for a predetermined time period or longer. The above other sequential processes shown in FIGS. 4 and 5 are made if any.

As described above, if the disconnection between the mobile terminal and the base station appears during the downloading process, then after the connection between the mobile terminal and the base station is again established, then the non-received next data sets are downloaded to the mobile terminal without re-downloading the once received data set.

Subsequent to the complete download of the entirety of the update data, then the operation test is made for confirmation of the operation based on the updated software.

If the updated software is defective, then the defective updated software is rewritten into the old-version software, whereby the mobile telephone becomes operable even in the old-version software.

In the foregoing descriptions, the entirety of the system software is re-written into the new version one. It is, off course, possible that the different part of the system software between the new and old versions is selectively subjected to the up-dating process efficiently.

The present invention is also applicable to the other software than the system software.

The present invention is also applicable to the other communication system between the non-mobile wireless terminal device and the base station.

The present invention is also applicable to the other communication system between the non-mobile wireless terminal device and the base station.

The present invention is also applicable to the other communication system between the non-mobile wireless terminal device and the base station.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A method of updating operation system software in a mobile terminal device by transmitting update data from a base station to the mobile terminal device comprising the steps of:
dividing the update data into a plurality of data sets by the base station;
transmitting the plurality of data sets by the base station with sequential pointers for each of the data sets to the mobile terminal device;
receiving the data sets with the sequential pointers by the mobile terminal device;
storing normal operation system software in a first storage area of the mobile terminal device;
storing the received data sets by the mobile terminal device in a third storage area of the mobile terminal device separate from the first storage area;
if a transmission of update data from the base station to the mobile terminal device is interrupted, then after verifying that the mobile terminal device is connected to the base station, confirming a next pointer for a remaining data set to be received and transmitting a data request with the next pointer by the mobile terminal device to the base station to re-start transmission of data sets beginning with the remaining data set;
after all data sets are received by the mobile terminal device, automatically performing an operation test on the update data to verify operation of updated operation system software; and
writing update data from the third storage area to the first storage area and resuming normal operation by the mobile terminal device.

2. The method of updating operation system software in a mobile terminal device recited in claim 1, further comprising the step of copying the normal operation system software from the first storage area to a second storage area while updating operation system software.

3. The method of updating operation system software in a mobile terminal device recited in claim 2, wherein if the update data includes defective data as determined by the operation test, further comprising the steps of:
copying the normal operation system software from the second storage are to the first storage area;
operating by the mobile terminal device using the normal operation system software stored in the first storage area; and
sending by the mobile terminal device an update request to the base station.

4. The method of updating operation system software in a mobile terminal device recited in claim 1, further comprising the step of transmitting by the mobile terminal device a notice to the base station that the operation system software was completely updated.

5. The method of updating operation system software in a mobile terminal device recited in claim 1, wherein the operation test is performed by transmission and receiving operations between the mobile terminal device and the base station.

6. A mobile terminal device which communicates with a base station and receives updated operation system software from the base station comprising:
a transmitter unit for transmitting data requests to the base station;
a receiver unit for receiving update data sets from the base station, update data being divided into data sets and transmitted with sequential pointers by the base station; and
a processor unit including a first storage area for storing system software for normal operation, a second storage area for providing a save area to the system software, the second storage area electrically connected to the first storage area, a third storage area for storing a updated operation system software, and an arithmetic unit operable based on normal operation system software stored in first storage area;
wherein the arithmetic unit stores received data sets in the third storage area and if transmission of update data from the base station to the mobile terminal device is interrupted, then after verifying that the mobile terminal device is connected to the base station, confirming by the arithmetic unit a next pointer for a remaining data set to be received and transmitting a data request by the transmitter unit to the base station to re-start transmission of data sets beginning with the remaining data set, and after all data sets are received by the mobile terminal device, automatically performing an operation test by the arithmetic unit to verify operation of updated operation system software, the arithmetic unit then writing update data from the third storage area to the first storage area and resuming normal operation of the mobile terminal device.

7. The mobile terminal device recited in claim 6, further comprising:
a display unit; and
an operational unit;
wherein the arithmetic unit instructs the display unit to display that operation system software is being updated and inhibits any inputs from the operation unit during an updating process.

8. The mobile terminal device recited in claim 6, wherein the arithmetic unit copies the normal operation system software from the first storage area to the second storage area while updating operation system software.

9. The mobile terminal device recited in claim 8, wherein if the update data includes defective data as determined by the operation test, the arithmetic unit copies the normal operation system software from the second storage are to the first storage area, operates using the normal operation system software stored in the first storage area, and sends an update request to the base station by the transmitting unit.

10. The mobile terminal device recited in claim 6, wherein the arithmetic unit transmits by the transmitting unit a notice to the base station that the operation system software was completely updated.

11. The mobile terminal device recited in claim 6, wherein the operation test performed by the arithmetic unit is by transmission and receiving operations between the mobile terminal device and the base station.

* * * * *